United States Patent [19]

Rozengart et al.

[11] 4,049,184
[45] Sept. 20, 1977

[54] METHOD OF MANUFACTURING POLYMETALLIC PIPES

[76] Inventors: Jury Iosifovich Rozengart, ulitsa Fuchika 14, kv. 11; Viktor Yakovlevich Ostrenko, ulitsa Komsomolskaya, 65/44; Efim Abramovich Reznikov, ulitsa Simferopolskaya, 19/10; Izrail Moishevich Sukonnik, ulitsa Poligonnaya, 22/16; Oleg Georgievich Fedorov, prospekt Ilicha, 21/15; Robert Georgievich Kheifets, ulitsa Kirova, 8/29; Viktor Jurievich Untilov, ulitsa Kazakova, 11 8/29; Jury Viktorovich Chichkov, prospekt Kirova, 48a/45; Vladimir Khrisanfovich Kasyan, ulitsa Naberezhnaya imeni Lenina, 1/132; Lev Semenovich Lyakhovetsky, ulitsa Lenina, 1/12, all of Dnepropetrovsk, U.S.S.R.

[21] Appl. No.: 693,554

[22] Filed: June 7, 1976

[51] Int. Cl.² ................................................ B23K 19/00
[52] U.S. Cl. .................................. 228/131; 228/173; 228/186; 228/193; 228/243
[58] Field of Search ............... 228/131, 141, 173, 186, 228/193, 242, 243

[56] References Cited

U.S. PATENT DOCUMENTS

| | | | |
|---|---|---|---|
| 2,975,259 | 3/1961 | Osborn, Jr. ...................... | 228/186 X |
| 3,314,139 | 4/1967 | Whittaker et al. .............. | 228/131 X |
| 3,862,489 | 1/1975 | Weisinger ........................ | 228/193 X |

Primary Examiner—James L. Jones, Jr.
Assistant Examiner—K. J. Ramsey
Attorney, Agent, or Firm—Lackenbach, Lilling & Siegel

[57] ABSTRACT

The method of manufacturing polymetallic pipes according to the invention consists of preparing the contacting surfaces of pipe billets, sealing off the gap between the billets at their ends and forming a multilayer pipe billet, heating said billet, placing it into a die and sealing off the space of the pipe billet, and filling said space with a fluid medium for exerting pressure on the internal surface of the billet, said pressure being sufficient for producing a diffusion joint.

According to the invention, the temperature gradient in the body of the pipe billet is distributed so that the temperature at one end of the billet is lower than it is in its other parts.

9 Claims, 7 Drawing Figures

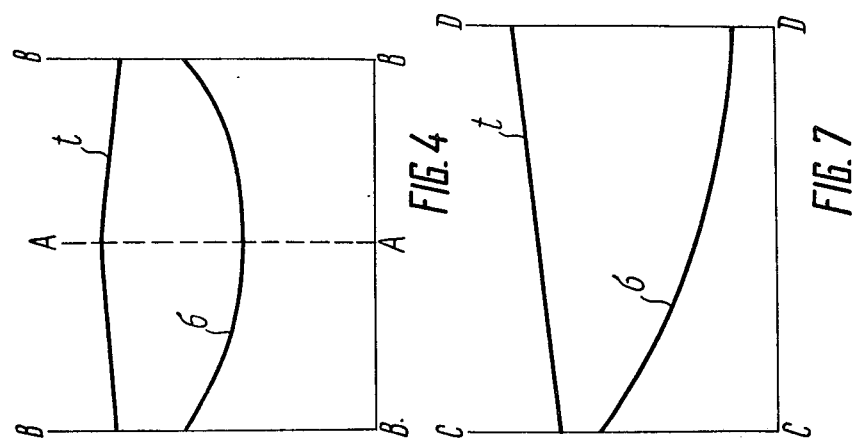
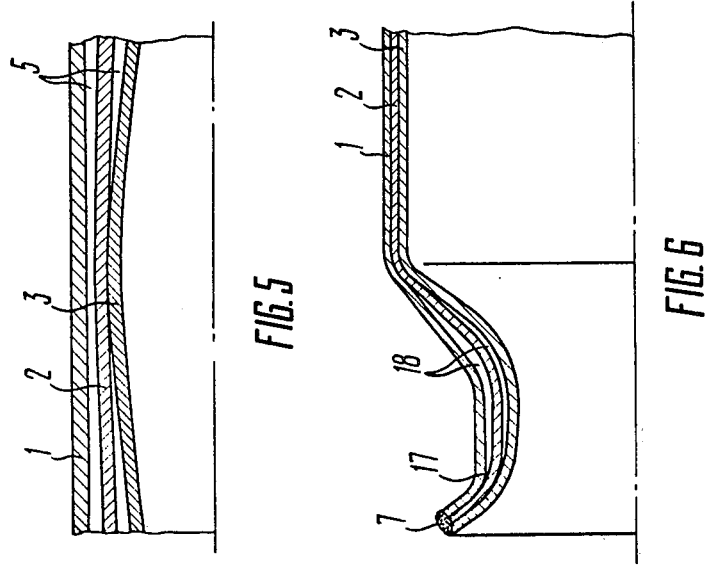

METHOD OF MANUFACTURING POLYMETALLIC PIPES

The present invention relates to the field of pipe manufacture and more particularly it relates to the methods of manufacturing polymetallic pipes.

The present invention will be used to advantage in the manufacture of pipes for atomic power engineering in heat exchangers with liquid metals and in pipelines carrying aggressive liquids.

The invention can also be utilized in the radio industry for the production of waveguides, in chemical machine-building for the manufacture of containers and pipelines intended to hold or carry aggressive liquids, and in machine-building for making bearing shells, wearing elements, caterpillar track pins, etc.

The universally known methods of manufacturing bimetallic pipes are based on joint hot rolling of two pipe billets assembled into a two-layer pipe billet. Being distinguished by a high output, these methods fail to ensure a sufficiently high quality of their joint along the entire area of contact between the billets. This is caused by pure fashion due to oxides and other impurities on the pipe surfaces which practically cannot be avoided in these methods of manufacture. In addition, the pipes are characterized by considerable variations in the thickness of the main and covering layers. Thus, the thickness variations of the covering layer of the bimetallic pipes manufactured on continuous rolling mills reaches 40–50%.

Also widely known is a method of manufacturing bimetallic pipes by pressing. In this method preparation of the pipe billets before inserting one of them into the other is highly difficult since it involves previous high-precision machining. The thickness variations of the covering layer in pressing bimetallic pipes are also very large, reaching 40%.

Widely known is a method of thermal diffusion welding wherein the diffusion jointing of two pipe billets is ensured by heating them in a shielding gas due to the higher thermal expansion coefficient of the inner pipe. Being noted for high precision of diameter and wall thickness of the manufactured pipes, this method is, however, suitable for turning out a narrow nomenclature of pipes, both with respect to size and chemical composition of the welded billets.

In another method of manufacturing polymetallic pipes the thin-walled pipes inserted one into another in the form of a multilayer billet are placed into an enveloping thick-walled pipe which functions as a die whose thermal expansion coefficient is lower than that of any one of the pipes in the multi-layer billet, and heated. To prevent diffusion jointing of the multilayer billet with the pipe-die, the internal surface of the latter is covered with a layer of a diffusion-preventing material.

During subsequent joint heating the multilayer billet expands in diameter faster than the die and is pressed to the latter while the component pipes of the multilayer billet are pressed against one another and welded over the contacting surfaces, forming a polymetallic pipe. After cooling, the polymetallic pipe is extracted from the outer enveloping pipe. This method is characterized by a low output and calls for heating in a shielding gas. Besides, it is extremely difficult to select a material for the outer pipedie. The force of pressing the pipes to one another varies within a wide range due to natural variations in the diameters of the pipes in the set which interferes with reliable and strong welding.

Another known method of manufacturing bimetallic pipes consists in the following.

A thin-walled pipe billet with a prepared outer contacting surface is inserted into a pipe billet with a prepared inner contacting surface. The two-layer pipe billet assembled in this manner is placed in a die, the gap between the billets is sealed off at the billet ends, the space between the billets is vacuumized, the inner space of the billet is sealed off and filled with a fluid medium, i.e. molten salts heated to the temperature of hot plastic deformation of the metal of the inner pipe billet. Being heated, the inner billet expands. Further deformation is accomplished by raising the pressure of the fluid medium acting on the internal surface of the billets to the value sufficient for making a diffusion joint. The joint between the billets is made still stronger by delivering ultrasonic vibrations into the molten salts.

A disadvantage of the above-described method consists in that deformation of the inner pipe after heating commences in chance sections whose location depends on thickness variations, structural heterogeneity and defects in the metal. If we take into account that vacuumization of the gap between the heated pipes is extremely difficult and that a certain amount of air will always remain in said gap, it is obvious that in the above-described process of deformation the irregularly scattered gas bubbles will be inevitably trapped in the chance sections between the welded surfaces. This interferes with efficient welding, creates zones of inadequate fusion and impairs the quality of the bimetallic joint.

Moreover, the above-described method is not efficient due to the complicated operations involved in preparing and machining the pipe billet and is suitable only for manufacturing pipes wherein the wall of the inner pipe functioning as a covering layer is considerably thinner than that of the outer pipe. If the covering layer is made of a pipe with considerably thick walls this results in solidification of the melt which transfers the accumulated heat energy for heating the thick pipe, receiving no compensation for the heat lost in the process. This factor limits considerably the nomenclature of the manufactured pipes.

Realization of this method requires a wide range of intricate equipment, namely, a system for sealing off and vacuumizing the gap between the pipe billets in the die, a system for pumping the high-temperature fluid medium, i.e. molten salts, and an ultrasonic generator.

The pipes manufactured by this method have to be cleaned of the molten salts solidified on the internal surface.

An object of the present invention is to eliminate the aforesaid disadvantages.

The main object of the invention is to provide a method of manufacturing polymetallic pipes wherein the properly selected temperature conditions would prevent formation of gas bubbles between the contacting surfaces thus ensuring efficient diffusion jointing of the pipe billets throughout their contacting surfaces.

The main object of the invention is to provide a method of manufacturing polymetallic pipes which would ensure efficient diffusion jointing of the pipe billets throughout their contacting surfaces.

This object is accomplished by providing a method of manufacturing polymetallic pipes comprising preparing the contacting surfaces of pipe billets, arranging coaxially said pipe billets, sealing off the gap between the billets at their ends to form a multilayer pipe billet, heating said billet, placing it in a die followed by sealing off the inside space of the pipe billet, and filling said space with a fluid medium for applying pressure to the inside surface of the billet, said pressure being sufficient for producing a diffusion joint wherein, according to the invention, the temperature of the billet body at least one end is made comparatively lower than it is in the other parts of said billet.

The temperature gradient created along the multilayer billet results in the resistance to deformation in the more intensively heated sections of said billet being lower than that in the less heated sections. On application of the internal pressure the more intensively heated portions of the pipe will be first to be deformed, the gap between the pipe billets will diminish and disappear and the gases will move from this gap, away from the zones being deformed. This process of deformation accompanied by the vanishing of the gap and expulsion of gases will be directed towards the less heated parts of the billet, i.e. to the ends (or end) of the pipes. This method of gas expulsion leaves no gas bubbles between the contacting surfaces and, in combination with the effect of temperature and pressure, ensures efficient diffusion jointing of the pipe billets throughout their contacting surfaces.

One of the possible embodiments of the method may consist in creating the temperature gradient along the multilayer billet by heating the middle portion of the billet to a higher temperature which diminishes gradually towards the billet ends. This ensures directional expulsion of gases in the course of application of pressure and deforming force from the gap between the billets so that the gases are expelled from the middle to the ends, thus producing a high quality diffusion joint between the billets.

Another possible embodiment of the method of manufacturing polymetallic pipes may consist in creating a temperature gradient along the multilayer billet by heating the latter so that its temperature is raised gradually from one of its ends to the other. This ensures directional expulsion of gases from the gap between the billets during application of pressure and deforming force so that the gases are expelled from the more heated to the less heated end and this produces a high-quality diffusion joint between the billets. This version of the method can be utilized for short billets ($l \leq 15D$) in which it is difficult to create a temperature gradient between the middle of the billet and its ends.

In still another possible embodiment of the method of manufacturing polymetallic pipes the temperature gradient along the multilayer billet is created by filling said billet with a fluid medium whose temperature is lower than that of the billet; the fluid is introduced from both ends of the billet so that the temperature of the latter drops from the middle towards the ends. This ensures directional expulsion of gases out of the gap between the pipe billets from the middle to the ends thus producing a high-quality diffusion joint of the billets. This version can be used when the heating means are incapable of creating the temperature gradient along the length of the billet, for example, when burners in a gas furnace are spaced uniformly and cannot be individually adjusted.

A further embodiment of the method of manufacturing polymetallic pipes consists in creating the temperature gradient along the length of a multilayer pipe billet by filling the latter with a fluid medium whose temperature is lower than that of the billet; the fluid in this case is introduced from one end of the billet so that the temperature of the latter diminishes from one end to the other. This ensures directional expulsion of gases from the gap between the billets from the more heated to the less heated end and a high-quality diffusion jointing of the billets. This version of the method can also be utilized when the means of heating are also incapable of creating the temperature gradient along the length of the billet and a short billet prevents creating this temperature gradient when the fluid is fed from two ends because of overlapping of the cooling zones.

Owing to a sharp change in volume during gas evolution and simplicity of feeding a liquid into the inside space of the pipe it is expedient that the fluid medium exerting pressure on the inside surface of the billet should be constituted by a gas-generating liquid.

Said fluid medium may also be constituted by a gas under pressure in cases when the covering layer is very thin and can be excessively cooled by a liquid fluid medium.

Now the invention will be described in detail by way of example with reference to the accompanying drawings in which:

FIG. 4 shows a curve of temperature distribution throughout the length of the billet with the temperature gradient directed from the middle to the ends, and a corresponding curve showing the changes in the resistance to deformation;

FIG. 5 is a schematic view of the gap between the pipe billets at the beginning of deformation;

FIG. 6 is a schematic view of the end of a pipe with a gas pocket (enlarged in comparison with FIG. 3);

FIG. 7 shows a curve of temperature distribution throughout the length of the billet with the temperature gradient directed from one end to the other, and a corresponding curve showing the changes in the resistance to deformation.

Figure 1:
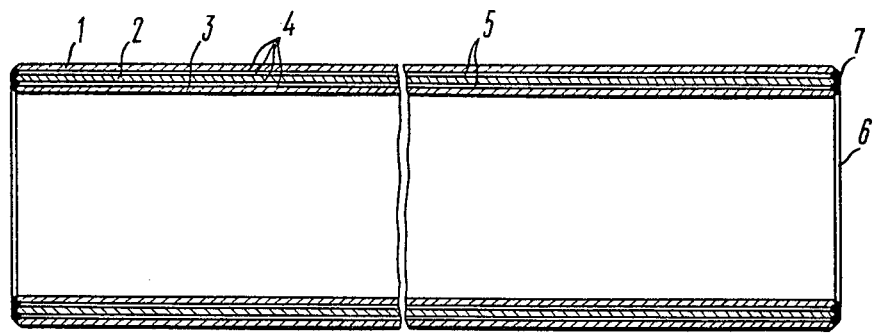
FIG. 1 is a schematic view of a multilayer billet consisting of three pipe billets, prepared for heating.

The method of manufacturing polymetallic pipes consists in the following.

First, the pipe billets 1, 2 and 3 (FIG. 1) are prepared on the contacting surfaces 4. This preparation includes, as a rule, degreasing the surfaces 4 in alkalinous baths, pickling them in acid baths, washing in hot water, drying and airblasting.

The pipe billets have different chemical compositions governed by the service requirements for the polymetallic pipe; this involves different sets of operations used for preparing the contacting surfaces 4 and different conditions under which said operations are performed. However, whatever the nature of preparations, the prepared contacting surfaces 4 should be free of oxide films, rust, traces of oil and moisture, and foreign particles.

If the pipe billets 1,2,3 are of a limited length, their contacting surfaces 4 may be prepared by machining.

The pipe billets 1,2,3 in a multilayer billet may have an arbitrary relation of the wall thicknesses and heat expansion coefficients.

The pipe billets 1,2,3 are inserted coaxially into one another observing perfect cleanliness, i.e. exerting care to prevent oil drops, dirt, moisture and foreign particles from getting on the contacting surfaces 4.

Then the gap 5 (FIG. 1) between the billets 1,2,3 is sealed off at the pipe ends 6 by an electric weld 7 using a nonconsumable or consumable electrode in a shielding gas. The billets may also be sealed off by dipping their ends 6 into a melt whose melting temperature is higher than the temperature to which the billet will be subsequently heated. It is also possible to use rings made of a material whose thermal expansion coefficient is lower than that of the billets 1,2,3. These rings are fitted tightly on the ends of the multilayer billet, thus eliminating the gaps 5 between the pipe billets 1,2,3.

The gap 5 between the pipe billets 1,2,3 should be sealed off in order to ensure cleanliness of the contacting surfaces 4 at the later stages of pipe manufacture.

After sealing off the gap 5 between the billets 1,2,3, the multilayer pipe billet shown in FIG. 1 is heated in a gas or electric furnace to the temperature which is the maximum for the metal (or alloy) with the lowest melting point out of the metals included into the multilayer billet, said temperature not leading to irreversible deterioration of the metal and still ensuring a high diffusibility.

Figure 2:
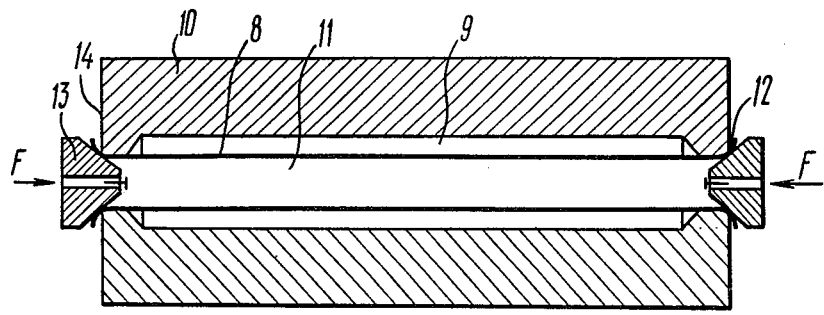
FIG. 2 shows a multilayer billet with a sealed-off space, placed in a die.

The heated billet 8 (FIG. 2) is placed into the space 9 of the die 10 (the billet should be transferred as quickly as possible to prevent its undue cooling) and the space 11 of the multilayer pipe billet is sealed off. The billet 8 placed in the die 10 protrudes at its ends 12 by 20–40 mm to allow upsetting the protruding ends 12 between the sealing elements 13 and the face surfaces 14 of the die 10.

The sealing elements 13 may be of any conventional type such as, for example, tapered or curvilinear metal plugs.

The sealing force F should be 1.25–1.5 times stronger than the sum of forces required for upsetting the end 12 of the multilayer pipe billet and of forces acting on the sealing plugs from the side of the space 11 of said billet.

A fluid medium 15 (FIG. 3) with a temperature lower than that of the billet is introduced under pressure in the form of a gas-generating liquid or gas into the space 11 of the multilayer billet.

Figure 3:
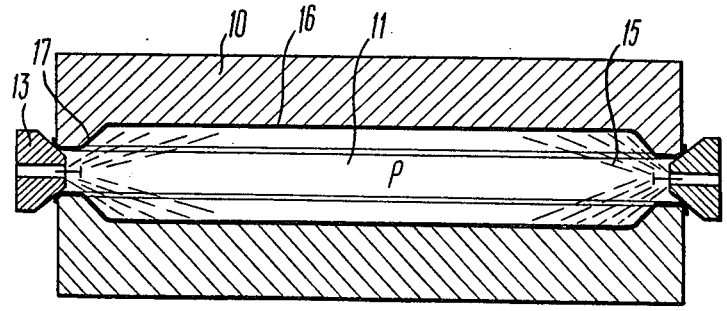
FIG. 3 shows a polymetallic pipe in a die, the pipe being made by deformation of a multilayer billet.

The increasing pressure P in the billet space 11 presses the pipes 1,2,3 of the multilayer billet tightly against one another and deforms them jointly to the preset diameter. Thin lines in FIG. 3 show the position of the billet at the initial moment of deformation. The extent of deformation is governed by the relation of the outside diameter of the multilayer billet to the diameter of the space 9 in the die 10 in which said billet is placed. Hot deformation is conducive to diffusion jointing of the pipes 1,2,3 of the multilayer billet into a polymetallic pipe 16 (FIG. 3) since the fine structural defects caused by said deformation function as additional diffusion channels.

The diametrical deformation can be carried out within a range of 0–50% depending on the diffusibility of the joined materials and on the required final size of the polymetallic pipe 16.

The pressures required for the manufacture of polymetallic pipes in a wide range of sizes and material combinations vary from 100 to 300 kgf/cm$^2$.

The duration of pressure application to the multilayer billet is from 3 to 10 s; there is no sense in increasing the duration above the indicated limit since the temperature of the pipe contacting the cold die drops to such values at which diffusion practically ceases.

On completion of deformation and welding, the pressure in the space of the polymetallic pipe 16 is reduced to atmospheric the pipe 16 is extracted from the die 10 and the trimmings 17 are removed.

Then the produced polymetallic pipe 16 can be used as a finished product or as a billet for reworking by hot or cold rolling.

To prevent the gas contained in the gap 5 between the pipes 1,2,3 of the multilayer billet from remaining in the form of gas bubbles between the contacting surfaces 4 in the process of pressure application, the method according to the invention includes creating a temperature gradient along the length of the multilayer pipe, said gradient assisting in expulsion of gas towards one or both ends 12 of the billet.

In one of the possible versions of the method the temperature gradient along the length of the multilayer billet is created by heating the middle portion of the billet, shown by line A — A in FIG. 4, to a higher temperature $t$ which drops gradually to the billet ends shown by lines B — B. Such a form of heating can be attained by selecting the appropriate arrangement, number and operating conditions of burners in gas furnaces or of heating elements in electric furnaces. Screen partitions can also be additionally used.

As a result, a higher temperature in the middle part (line A — A) of the multilayer billet and a lower temperature at the billet ends (lines B — B) causes the resistance to deformation $\sigma$ in the middle of the billet (line A — A) to be at a minimum and to gradually increase towards the billet ends (lines B — B). Hence, on application of pressure, the gap 5 (FIG. 5) between the pipes 1,2,3 of the multilayer billet begins vanishing at the point where the resistance to deformation $\sigma$ is minimum, i.e. in the middle part of the billet (line A — A) in FIG. 4); the zones of deformation are gradually shifted in the direction where the resistance to deformation $\sigma$ is higher, i.e. to the ends 12 of the billet. The gas moves from the gap 5 to the ends 12 of the billet and forms gas pockets 18 (FIG. 6) which later remains in the trimmings 17. The entire remaining length of the multilayer billet is welded into the polymetallic pipe 16. This type of temperature gradient can be created only in the pipe billets whose length $l > 15D$.

In another possible version of the method of manufacturing polymetallic pipes the temperature gradient throughout the length of the multilayer billet is created by heating the billet so that the temperature gradually increases from one billet end (line C — C in FIG. 7), to the other (line D — D). As before, this is attained by changing the number, arrangement and operating intensity of the heating elements in the gas or electric furnaces.

In the given case, deformation and elimination of the gap 5 and, consequently, expulsion of gas from the gap 5 correspond to the nature of changes in the resistance to deformation $\sigma$ and proceed from the more heated end (line D — D) to the less heated end (line C — C), forming gas pockets 18 near the less heated end. This version can be utilized for welding short multilayer billets with a length-diameter ratio being less than or equal to 15.

In some cases the heating means cannot ensure a temperature gradient in the multilayer billet from its middle to the end or from one end to the other. In gas furnaces this may occur, for example, when the burners are equispaced over the working space of the furnace and cannot be individually controlled. In electric furnaces this may occur, for example, when the direction of the billet axis coincides with the axes of the heating elements.

In this case the temperature gradient can be created along the length of the billet by using a fluid medium 15 whose temperature is lower than that of the billet and introducing said medium from both ends 12 of the billet so that the billet temperature decreases from the middle (line A — A) towards the ends (lines B — B) as shown in FIG. 4. Inasmuch as the fluid medium 15 used for increasing pressure in the space 11 of the billet is colder than the billet proper, the fluid jet contacting the billet surface will cool down the latter. By changing the geometry of the jet introduced into the billet it is possible to achieve more intensive cooling at the ends (when the fluid medium is supplied from both ends) with a gradual increase of temperature towards the middle of the billet.

In this case only the inner pipe billet is cooled which confines the utilization of this version only to the manufacture of bimetallic pipes from two-layer billets.

The produced temperature gradient directed from the middle of the billet (line A — A) to its ends (lines B — B) ensures, on increase of pressure in the space 11 of the two-layer billet, a directional expulsion of gases (from the middle to the ends) from the gap 5 between the outer and inner pipes and, consequently, absence of gas bubbles between the contacting surfaces 4. In combination with the effect of temperature and pressure this ensures high-quality diffusion welding over the entire contacting surface except the pipe portions removed as trimmings 17 which contain gas pockets 18 with the gas expelled from the other portion of the gap 5.

By feeding the fluid medium 15 into the space 11 of the two-layer billet it is possible to create a temperature gradient characterized by a temperature drop along the length of the billet from one end (line D — D) to the other (line C — C) similarly to the curve in FIG. 7. This is achieved by one-sided delivery of the fluid medium 15 to the billet and can be used with short billets whose length-diameter ratio is less than or equal to 15 where it is possible to achieve a gradual temperature gradient from end to end. This will ensure expulsion of gas in the direction from the hot end (line D — D) to the cold end (line C — C) from the gap 5 between the outer and inner pipes of the two-layer billet, reliable contact between the entire area of contacting surfaces 4 without gas bubbles between them and, in combination with the effect of temperature and pressure P, diffusion jointing of two pipes to from a bimetallic pipe. The colder end contains a gas pocket 18 which is later removed in the cut-off trimming 17.

Due to a great change in volume during gas generation and simplicity of fluid delivery into the space 11 of the multi-layer billet it is practicable that the fluid medium 15 exerting pressure P on the inside surface of the billet should be constituted by a vaporizing liquid, such as water. During vaporization and superheating the volume of water increases over 2000 times relative to the initial volume thus producing pressures sufficient for reliable diffusion jointing of pipes into a polymetallic pipe.

If the inner pipe has a thin wall (thinner than 3 mm), filling the billet with a fluid medium whose temperature is lower than that of the billet may reduce the temperature of the inner pipe to a limit which renders diffusion jointing of pipes into a polymetallic pipe difficult or altogether impossible. In this case the fluid medium may be used in the form of a gas under pressure since the cooling capacity of gas is considerably lower than that of the liquid medium.

EXAMPLE 1

The external layer of the pipe billets was made of stainless steel pipe 97×3 mm, the middle layer of carbon steel pipe 89×6 mm, and the inner layer of stainless steel pipe 76×3 mm.

The stainless steel pipes were pickled in a hydrofluoric acid solution, washed in hot water and dried with fans.

The carbon steel pipe was ground on the outside on an abrasive belt grinder and sandblasted on the inside after which both surfaces were wiped with alcohol and dried.

The prepared pipes were assembled coaxially, their ends were subjected to cold rotary forging after which the three-layer billet was sink-drawn to a diameter of 93 mm to reduce the gap between the pipes.

The next step was to cut the billet with a cut-off wheel into pipe branches 525 mm long for laboratory machining, the billet ends were sealed by argon-arc welding with a nonconsumable tungsten electrode and stainless steel additional wire.

The billets sealed at the ends were heated in a gas-chamber kiln so that the temperature of the middle portion of the billet was 1250° C, gradually dropping to 1190°–1200° C towards the ends.

The heated billet was transferred into a die whose inside space had a diameter of 110 mm, the space of the three-layer billet was sealed off by upsetting its ends protruding by 25 mm from the die after which 120 g of finely-dispersed atomized water was introduced between the plugs of the sealing system and the face surfaces of the die. Owing to vaporization and steam generation of water, pressure in the space grew within 5 s to 220 kgf/cm$^2$ and the three-layer billet was deformed to contact the inside surface of the die, i.e. by 18% approximately in diameter. Then the pressure in the pipe was reduced to the atmospheric level, the pipe was extracted from the die and the pipe ends were trimmed. A longitudinal section through the trimmings showed gas pockets and in this zone the pipe billets were not welded to one another. The diffusion joint throughout the pipe portion of 110 mm diameter was strong which was confirmed by flattening and flaring tests of specimen rings.

Subsequently, these pipes were cold-rolled to 22×2.5 mm and tested by an unltrasonic flaw detector at this size and at the intermediate diameter of 48 mm. The ultrasonic flaw test showed that there were no laminations and porosity.

EXAMPLE 2

A two-layer 67×10 pipe prepared for welding consisted of an external structural-steel billet with a wall 6 mm thick and an internal copper billet with a wall 4 mm thick. Preparation included cleaning of the contacting surfaces and mandreldrawing aimed at reducing the gap between the billets.

Then the two-layer billet was cut into 525 mm lengths for laboratory machining and the ends were welded as described in Example 1 above.

The two-layer billet with the sealed-off gap was heated in a gas furnace so that the temperature at one end of the billet was 1000° C decreasing to 960° C at the other, transferred into a die, the inner space of the billet was sealed off and filled with 90 g of finely dispersed atomized water. Due to vaporization, pressure inside the two-layer billet rose within 3 s to 240 kgf/cm$^2$, and the two-layer billet was deformed; then the pressure was relieved to the atmospheric level, the sealing plugs were withdrawn and the pipe extracted from the die. After cutting the pipe it was discovered that the less-heated end of the pipe had a gas pocket, while the other end had none. The pipe with a diameter of 77 mm corresponding to a diametrical deformation of 15% was welded reliably throughout its length as confirmed by technological and ultrasonic tests.

The method of manufacturing bimetallic pipes according to the invention is suitable for joining pipe billets of steels and iron alloys and of nonferrous metals and alloys.

The method is adaptable for joining pipes made of hard-to-work steels and alloys in which case the diametrical deformation is close to 0%.

The relation of the thermal expansion coefficients of the pipes included into the multilayer billet may be taken at random since it exerts no influence on the quality of the joint. Therefore, the use of external pipes with a higher thermal expansion coefficient than that of the internal pipes does not interfere with their diffusion jointing.

The method according to the invention places practically no limitations on the increase in the diameter of the joined pipes while the minimum diameter is limited by the diameter of the inside space of the billet which is 50 mm approximately. Smaller sizes of polymetallic pipes can be obtained by joining larger sizes and reworking them in a cold state to a smaller size.

The method does not limit the relation of the wall thicknesses of the pipes included into the multilayer billet but limits the relation of the summary thickness of the wall to the diameter of the polymetallic pipe by 0.25.

If the die for flaring and welding the multilayer billet is made of a special shape, it is possible to manufacture a polymetallic pipe with projections, ribs and with a variable diameter.

The pipes manufactured by the method according to the invention can be made in a wide range of sizes and materials subjected to diffusion jointing.

The manufactured pipes are noted for a high precision of diameter and wall thickness (both total and in individual layers) and for strength of the diffusion joint.

After welding they can be either reworked by any method or used as a finished product.

We claim:

1. A method of manufacturing polymetallic pipes consisting of preparing the contacting surfaces of pipe billets for producing a diffusion joint between them; inserting said pipe billets coaxially into one another; sealing off the gap between said pipe billets at the ends of said billets thus forming a multilayer pipe billet; heating said multilayer pipe billet and placing it in a die; sealing off the space of said multilayer pipe billet; filling said space of said multilayer pipe billet with a fluid medium for building up pressure inside said space; creating a temperature gradient in the body of said multilayer pipe billet so that the temperature at at least one end of said billet is lower than it is in the other parts of said billet; and selecting a pressure sufficient for making a diffusion joint between said contacting surfaces of said pipe billets.

2. A method according to claim 1 wherein said temperature gradient along the length of the multilayer pipe billet is created by heating the middle part of the billet to a high temperature which drops gradually towards the billet ends.

3. A method according to claim 1 wherein said temperature gradient along the length of the multilayer pipe billet is created by heating the billet so that its temperature increases from one of its ends to the other.

4. A method according to claim 1 wherein the temperature gradient along the length of the multilayer billet is created by introducing a fluid medium from both ends of the billet so that the billet temperature drops from the middle towards the ends.

5. A method according to claim 4 wherein the fluid medium is constituted by a gas-generating liquid.

6. A method according to claim 4 wherein the fluid medium is constituted by a gas under pressure.

7. A method according to claim 1 wherein the temperature gradient along the length of the multilayer billet is created by introducing a fluid medium from one end of the billet so that the billet temperature drops from one end to the other.

8. A method according to claim 7 wherein the fluid medium is constituted by a gas-generating liquid.

9. A method according to claim 7 wherein the fluid medium is constituted by a gas under pressure.

* * * * *